US006053690A

United States Patent [19]
Hanson

[11] Patent Number: 6,053,690
[45] Date of Patent: Apr. 25, 2000

[54] SPARE TIRE CADDY WITH MECHANIZED ELEVATION MEANS

[76] Inventor: Kent L. Hanson, Harding St., Karlstad, Minn. 56732

[21] Appl. No.: 09/195,826

[22] Filed: Nov. 19, 1998

[51] Int. Cl.[7] .................................................. B62D 43/04
[52] U.S. Cl. .................. 414/463; 224/42.21; 224/42.33; 414/465; 414/466; 414/917
[58] Field of Search ..................................... 414/463, 465, 414/466, 498, 522, 917; 224/41.12, 42.21, 42.23

[56] References Cited

U.S. PATENT DOCUMENTS

| | | | |
|---|---|---|---|
| D. 287,959 | 1/1987 | Hooper, Jr. ............................ D12/202 |
| 2,574,465 | 11/1951 | Clark ....................................... 414/463 |
| 2,956,716 | 10/1960 | Goulet ..................................... 414/463 |
| 3,883,018 | 5/1975 | Hoisington .............................. 414/463 |
| 4,087,032 | 5/1978 | Miller et al. ......................... 224/42.23 |
| 4,301,954 | 11/1981 | Briggs ................................... 224/24.23 |
| 4,312,620 | 1/1982 | Muschalek, Jr. ....................... 414/466 |
| 4,428,513 | 1/1984 | Delmastro .............................. 414/466 |
| 4,522,325 | 6/1985 | McMillan ............................ 224/42.21 |
| 4,884,729 | 12/1989 | Barkouskie ......................... 224/42.21 |
| 5,076,629 | 12/1991 | Peters et al. ........................ 224/42.12 |
| 5,238,358 | 8/1993 | Higgins et al. ....................... 414/463 |
| 5,860,786 | 1/1999 | Aubrecht ................................ 414/463 |

*Primary Examiner*—Douglas Hess

[57] ABSTRACT

A spare tire caddy is provided including a mounting assembly adapted for being mounted on an underside of a vehicle. Also included is a tire pod slidably coupled to the mounting assembly for removably receiving a tire therein.

5 Claims, 3 Drawing Sheets

SPARE TIRE CADDY WITH MECHANIZED ELEVATION MEANS

BACKGROUND OF THE INVENTION

1. Field of the Invention

The present invention relates to tire stowage assemblies and more particularly pertains to a new spare tire caddy with mechanized elevation means for storing a spare tire beneath a vehicle in a secure and conveniently accessible manner.

2. Description of the Prior Art

The use of tire stowage assemblies is known in the prior art. More specifically, tire stowage assemblies heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,301,954; 3,883,018; 2,574,465; 4,087,032; 2,956,716; and U.S. Pat. No. Des. 287,959.

In these respects, the spare tire caddy with mechanized elevation means according to the present invention substantially departs from the conventional concepts and designs of the prior art, and in so doing provides an apparatus primarily developed for the purpose of storing a spare tire beneath a vehicle in a secure and conveniently accessible manner.

SUMMARY OF THE INVENTION

In view of the foregoing disadvantages inherent in the known types of tire stowage assemblies now present in the prior art, the present invention provides a new spare tire caddy with mechanized elevation means construction wherein the same can be utilized for storing a spare tire beneath a vehicle in a secure and conveniently accessible manner.

The general purpose of the present invention, which will be described subsequently in greater detail, is to provide a new spare tire caddy with mechanized elevation means apparatus and method which has many of the advantages of the tire stowage assemblies mentioned heretofore and many novel features that result in a new spare tire caddy with mechanized elevation means which is not anticipated, rendered obvious, suggested, or even implied by any of the prior art tire stowage assemblies, either alone or in any combination thereof.

To attain this, the present invention generally comprises a mounting assembly having a plate with a central extent equipped with a planar square configuration and a periphery including a front edge, a rear edge, and a pair of side edges. Such side edges each include a lip extending outwardly from the central extent in a plane level with and vertically offset from that in which the central extent of the plate resides. The central extent of the mounting assembly further includes a rubber seal lining an entire lower surface thereof. In use, the plate is adapted for being mounted on an underside of a vehicle. Also included is a pair of swing arm assemblies each including a side member having a substantially C-shaped cross-section along a length thereof. As shown in FIGS. 3 & 5, a pair of arms are each pivotally mounted between the lips of the plate of the mounting assembly and an outer side face of the associated side member. Further, a guide is mounted on an inner surface of the side member with a substantially C-shaped cross-section. A tire pod is provided including a circular bottom face, a cylindrical peripheral side wall coupled to the circular bottom face and extending upwardly therefrom. As such, an open top, upper peripheral edge, and an interior space are defined. The tire pod further includes a peripheral flange integrally coupled to the upper peripheral edge and extending outwardly therefrom in perpendicular relationship with a square periphery. Note FIG. 4. A pair of side bars are each mounted on opposite sides of the peripheral flange of the tire pod and extend downward therefrom in perpendicular relationship, as shown in FIG. 5. Further, a plurality of linearly aligned rollers are mounted on outer surfaces of the side bars for being slidably received within the guides of the swing arm assemblies. Finally, a retraction mechanism includes a dowel mounted between a front pair of the arm assemblies. FIG. 5 shows a sleeve rotatably mounted on the dowel. Mounted on the front edge of the plate of the mounting assembly is a pulley that extends upwardly therefrom. A motor is adapted for being mounted to a rear bumper of the vehicle. In operation, the motor serves to rotate about an axis coincident with a longitudinal axis of the vehicle upon the actuation thereof. Associated therewith is a string having a first end coupled to a central extent of the sleeved dowel and a second end wrapped about a pulley of the motor. As shown in FIGS. 1, 3, & 5, the string resides above the plate of the mounting assembly. By this structure, the tire pod may be transferred between a lowered orientation wherein a tire may be accessed therein and a raised orientation. In the raised orientation, the peripheral flange of the tire pod abuts the rubber seal of the mounting assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new spare tire caddy with mechanized elevation means apparatus and method which has many of the advantages of the tire stowage assemblies mentioned heretofore and many novel features that result in a new spare tire caddy with mechanized elevation means which is not anticipated, rendered obvious, suggested, or even implied by any of the prior art tire stowage assemblies, either alone or in any combination thereof.

It is another object of the present invention to provide a new spare tire caddy with mechanized elevation means which may be easily and efficiently manufactured and marketed.

It is a further object of the present invention to provide a new spare tire caddy with mechanized elevation means which is of a durable and reliable construction.

An even further object of the present invention is to provide a new spare tire caddy with mechanized elevation means which is susceptible of a low cost of manufacture with regard to both materials and labor, and which accordingly is then susceptible of low prices of sale to the consuming public, thereby making such spare tire caddy with mechanized elevation means economically available to the buying public.

Still yet another object of the present invention is to provide a new spare tire caddy with mechanized elevation means which provides in the apparatuses and methods of the prior art some of the advantages thereof, while simultaneously overcoming some of the disadvantages normally associated therewith.

Still yet another object of the present invention is to provide a new spare tire caddy with mechanized elevation means for storing a spare tire beneath a vehicle in a secure and conveniently accessible manner.

Even still another object of the present invention is to provide a new spare tire caddy with mechanized elevation means that includes a mounting assembly adapted for being mounted on an underside of a vehicle. Also included is a tire pod slidably coupled to the mounting assembly for removably receiving a tire therein.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
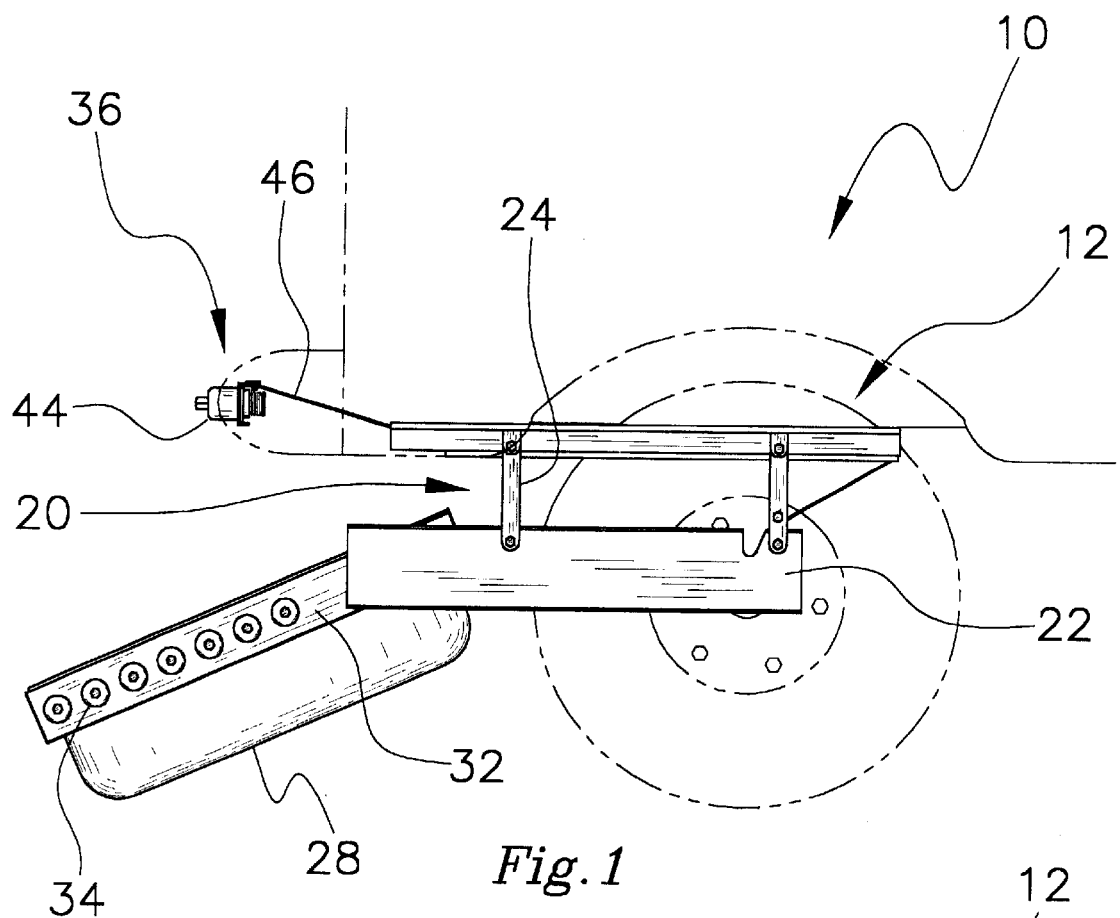
FIG. 1 is a side view of a new spare tire caddy with mechanized elevation means according to the present invention.
Figure 2:
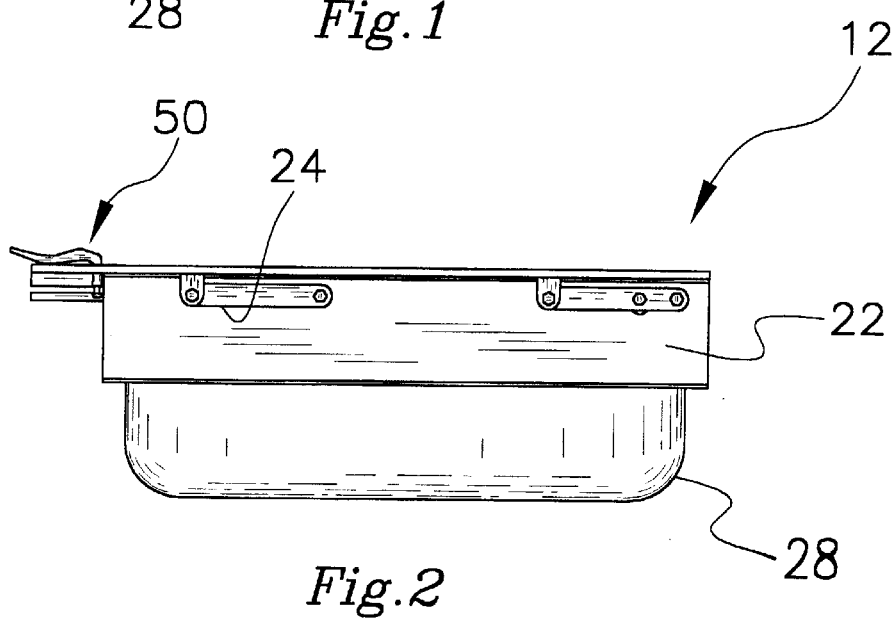
FIG. 2 is a side view of the present invention with the tire pod retracted and elevated beneath the mounting assembly.

With reference now to the drawings, and in particular to FIGS. 1 through 6 thereof, a new spare tire caddy with mechanized elevation means embodying the principles and concepts of the present invention and generally designated by the reference numeral 10 will be described.

The present invention, designated as numeral 10, includes a mounting assembly 12 having a plate with a central extent 14 equipped with a planar square configuration and a periphery including a front edge, a rear edge, and a pair of side edges. Such side edges each include a lip 16 extending outwardly from the central extent in a plane level with and vertically offset from that in which the central extent of the plate resides. The central extent of the mounting assembly further includes a foam or rubber seal 18 lining an entire lower surface thereof. In use, the plate is adapted for being mounted on an underside of a vehicle. This may be accomplished by a plurality of bolts or the like extending through the plate and engaged with the vehicle.

Figure 3:
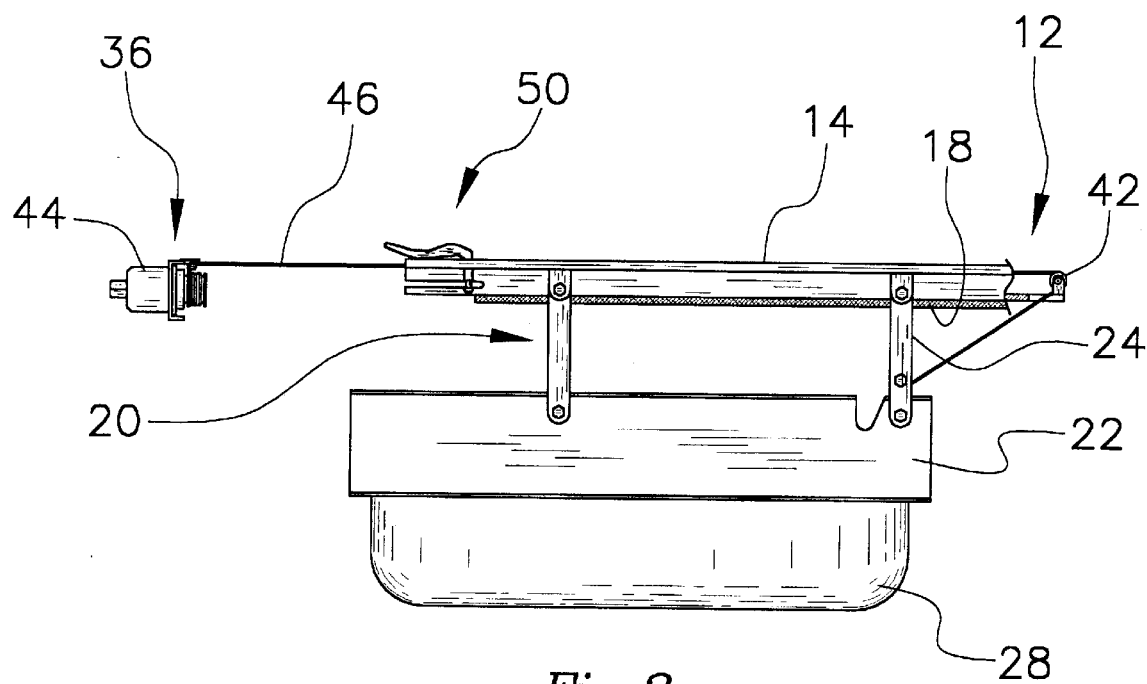
FIG. 3 is a side view of the present invention with the tire pod lowered beneath the mounting assembly.
Figure 4:
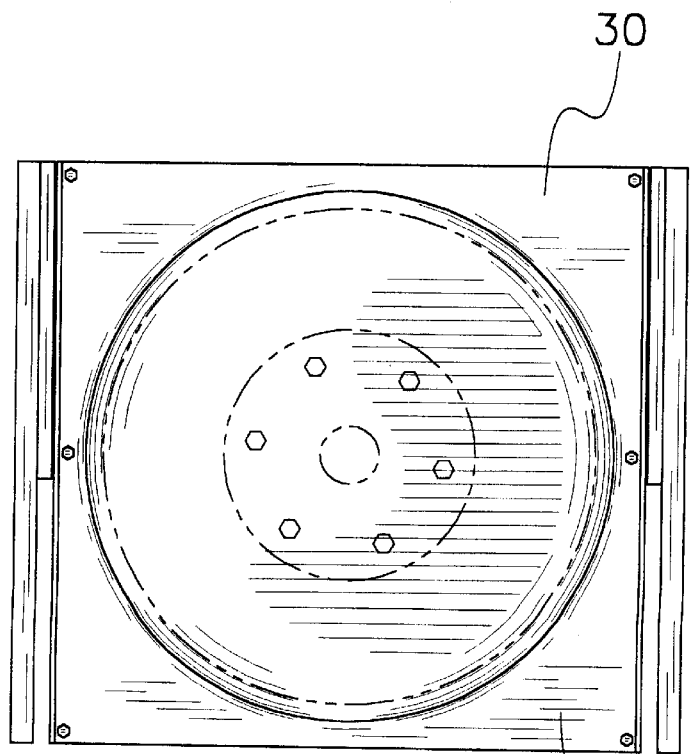
FIG. 4 is a top view of the tire pod of the present invention.
Figure 5:
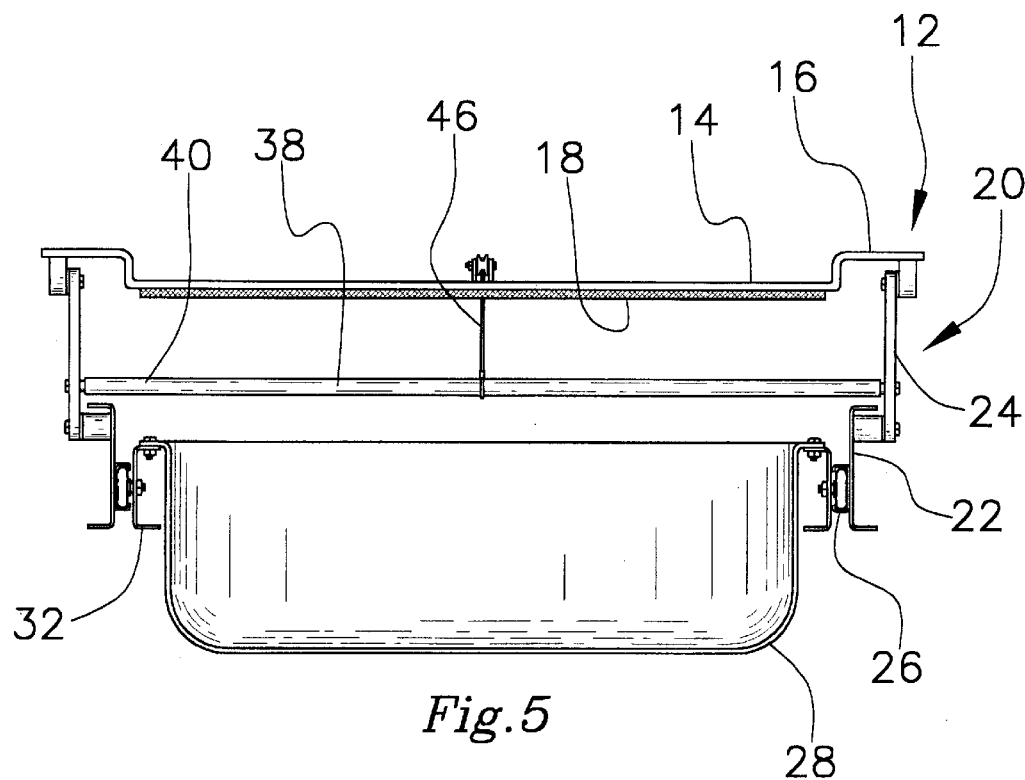
FIG. 5 is a rear view of the present invention with the tire pod lowered beneath the mounting assembly.
Figure 6:
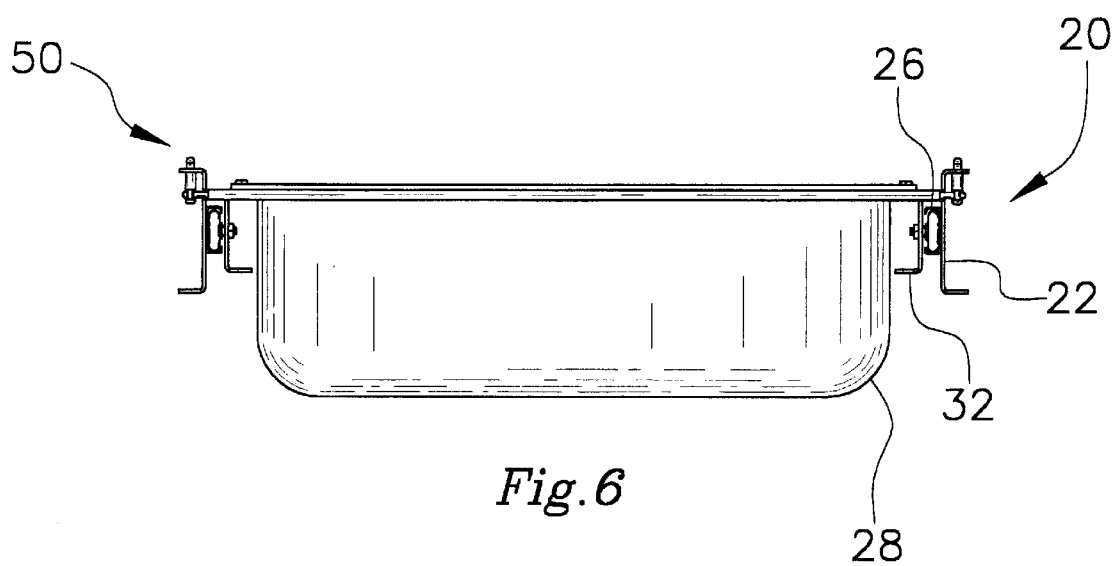
FIG. 6 is a rear view of the present invention with the tire pod raised beneath the mounting assembly.

Also included is a pair of swing arm assemblies 20 each including a side member 22 having a substantially C-shaped cross-section along a length thereof. As shown in FIGS. 3 & 5, a pair of arms 24 are each pivotally mounted between the lips of the plate of the mounting assembly and an outer side face of the associated side member. Ideally, the swing arms are about 6 inches in length. Further, a guide 26 is mounted on an inner surface of the side member with a substantially C-shaped cross-section.

A tire pod 28 is provided including a circular bottom face, a cylindrical peripheral side wall coupled to the circular bottom face and extending upwardly therefrom. As such, an open top, upper peripheral edge, and an interior space are defined. The tire pod further includes a peripheral flange 30 integrally coupled to the upper peripheral edge and extending outwardly therefrom in perpendicular relationship with a square periphery. Note FIG. 4. A pair of side bars 32 are each bolted on opposite sides of the peripheral flange of the tire pod and extend downward therefrom in perpendicular relationship, as shown in FIG. 5. As shown, the side bars have a shape similar to that of the side members, but half the width. Further, a plurality of linearly aligned rollers 34 are mounted on outer surfaces of the side bars for being slidably received within the guides of the swing arm assemblies.

Finally, a retraction mechanism 36 includes a dowel 38 mounted between lower extents of a front pair of the arms of the swing arm assemblies. FIG. 5 shows a sleeve 40 rotatably mounted on the dowel. Mounted on the front edge of the plate of the mounting assembly is a pulley 42 that extends upwardly therefrom. A motor 44 is adapted for being mounted to a rear bumper of the vehicle. In operation, the motor serves to rotate about an axis coincident with a longitudinal axis of the vehicle upon the actuation thereof. Associated therewith is a string 46 having a first end coupled to a central extent of the sleeved dowel and a second end wrapped about a pulley of the motor. As shown in FIGS. 1, 3, & 5, the string resides above the plate of the mounting assembly.

Ideally, the motor is connected to the vehicle battery and has a toggle switch or the like mounted thereon for selectively actuating the motor. Further, a guide is preferably positioned on the motor adjacent the pulley thereof for guiding the string such that the same remains perpendicular to an axis of rotation of the motor.

By this structure, the tire pod may be transferred between a lowered and raised orientation. In the lowered orientation, the tire pod may be slid out and angled downwardly so that a tire may be accessed therein. It should be noted that such angling of the tire pod occurs when only a final pair of rollers are within the guides. In the raised orientation, the peripheral flange of the tire pod abuts the rubber seal of the mounting assembly. Further, other hydraulic, electrical or mechanical mechanisms may be used to maneuver the tire pod in various alternate embodiments. Further, both the peripheral flange of the tire pod and the plate of the mounting assembly each preferably have a pair of apertures formed therein through which pin and clip combinations 50 may be inserted for securing the tire pod in the raised orientation.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A spare tire caddy comprising, in combination:
   a mounting assembly including a plate with a central extent having a planar square configuration with a periphery including a front edge, a rear edge, and a pair of side edges, each including a lip extending outwardly in a plane, the plane being level with and vertically offset from that in which the central extent of the plate resides, the central extent of the mounting assembly further including a rubber seal lining an entire lower surface thereof, wherein the plate is adapted for being mounted on an underside of a vehicle;
   a pair of swing arm assemblies each including a side member having a substantially C-shaped cross-section along a length thereof, a pair of arms, each pivotally mounted between the lips of the plate of the mounting assembly and an outer side face of the side member, a guide mounted on an inner surface of the side member with said substantially C-shaped cross-section;
   a tire pod including a circular bottom face, a cylindrical peripheral side wall coupled to the circular bottom face and extending upwardly therefrom to define an open top, an upper peripheral edge, and an interior space, the tire pod further including a peripheral flange integrally coupled to the upper peripheral edge and extending outwardly therefrom in perpendicular relationship with a square periphery, a pair of side bars each mounted on opposite sides of the peripheral flange of the tire pod and extending downward therefrom in perpendicular relationship, and a plurality of linearly aligned rollers mounted on outer surfaces of the side bars for being slidably received within the guides of the swing arm assemblies; and
   a retraction mechanism including a dowel mounted between a front pair of the arm assemblies, a sleeve rotatably mounted on the dowel, a pulley mounted on the front edge of the plate of the mounting assembly and extending upwardly therefrom, a motor adapted for being mounted to a rear bumper of the vehicle and adapted to rotate about an axis coincident with a longitudinal axis of the vehicle upon the actuation thereof, and a string having a first end coupled to a central extent of the sleeved dowel and a second end wrapped about a pulley of the motor such that the string resides above the plate of the mounting assembly and the tire pod may be transferred between a lowered orientation wherein a tire may be accessed therein and a raised orientation with the peripheral flange of the tire pod abutting the rubber seal of the mounting assembly.

2. A spare tire caddy comprising, in combination:
   a mounting assembly including a plate having a central extent, said central extent having a planar configuration, said central extent having a periphery including a front edge, a rear edge, and a pair of side edges, each of said front edge, said rear edge and said pair of side edges including a lip extending outwardly in a plane, the plane being level with and vertically offset from a plane in which the central extent of the plate resides, the central extent of the mounting assembly further including a rubber seal lining an entire lower surface thereof, wherein the plate is adapted for being mounted on an underside of vehicle;
   a pair of swing arm assemblies each including a side member, a guide, and a pair of arms, each of said pair of arms being pivotally mounted between the lips of the plate of the mounting assembly and an outer side face of the side member, said guide being mounted on an inner surface of the side member;
   a tire pod including a bottom face, a peripheral side wall coupled to the bottom face, said side wall extending upwardly from said bottom face to define an open top, an upper peripheral edge, and an interior space;
   the tire pod further including a peripheral flange coupled to the upper peripheral edge, the peripheral flange extending orthogonally outward from the peripheral edge, a pair of side bars, each side bar being mounted on opposite sides of the peripheral flange of the tire pod and extending orthogonally downward from the peripheral flange, and a plurality of aligned rollers mounted on outer surfaces of the side bars, said rollers being slidably insertable into the guides of the swing arm assemblies; and
   a retraction mechanism including a dowel mounted between a front pair of the arm assemblies, a sleeve rotatably mounted on the dowel, a pulley mounted on the front edge of the plate of the mounting assembly, the pulley extending upwardly from the front edge of the plate, a motor adapted for being mounted to a bumper of the vehicle and adapted to rotate about an axis coincident with a longitudinal axis of the vehicle, a string having a first end coupled to a central extent of the sleeved dowel and a second end wrapped about a pulley of the motor such that the string is positioned above the plate of the mounting assembly such that the tire pod is transferable between a lowered orientation wherein a tire may be accessed and a raised orientation defined by the peripheral flange of the tire pod abutting the rubber seal of the mounting assembly.

3. A spare tire caddy assembly comprising:
   a mounting assembly adapted for coupling to a vehicle;
   a pair of guides;

a pair of swing arm assemblies, each swing arm assembly coupling an associated one of said guides to a respective side of said mounting assembly, each swing arm assembly including a side member and a pair of arms, each guide being engageable to an associated one of said side members;

a tire pod adapted for holding a spare tire, said tire pod including a pair of side bars, each of said side bars being mounted on a respective side of the tire pod;

a plurality of linearly aligned rollers mounted on outer surfaces of the side bars for being slidably received within the guides; and a motor adapted for mounting to a bumper of the vehicle proximate the mounting assembly;

a sleeved dowel extending between said swing arm assemblies whereby said swing arm assemblies move in tandem; and a string having a first end coupled to the motor for retracting and extending said string from said motor, said string having a second end coupled to said sleeved dowel whereby retraction of said string lifts said tire pod into a raised position for storing the spare tire and extension of said string lowers said tire pod for permitting access to the spare tire.

4. The spare tire caddy assembly of claim 3, further comprising:

said tire pod being received within a periphery of said mounting assembly for preventing said tire pod from sliding in said guides when said tire pod is in said raised position.

5. The spare tire caddy assembly of claim 3, further comprising:

a pulley mounted to a side of said mounting assembly opposite said motor, a medial portion of said string being engaged to said pulley whereby said string urges said tire pod upwardly and away from said motor when said string is retracted by said motor.

* * * * *